Dec. 10, 1935.  S. M. WECKSTEIN  2,024,121
WHEEL AND BEARING
Filed June 3, 1935
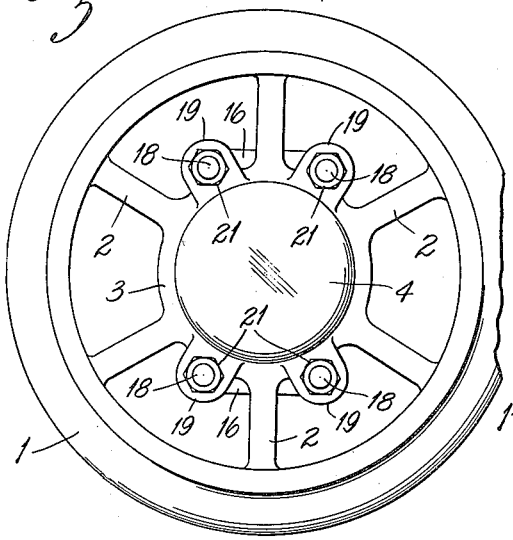
Fig. 1.
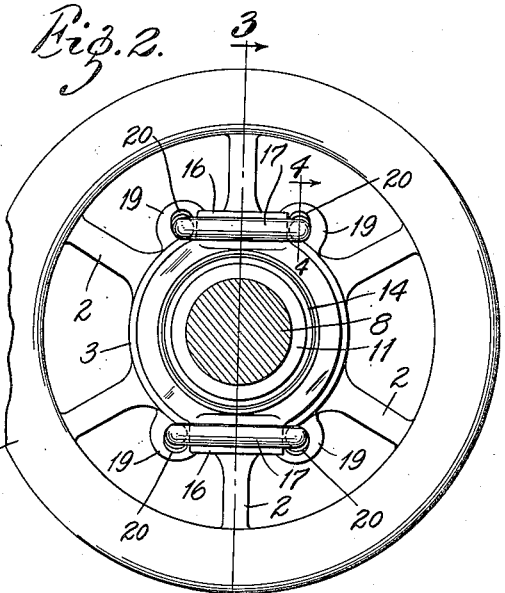
Fig. 2.
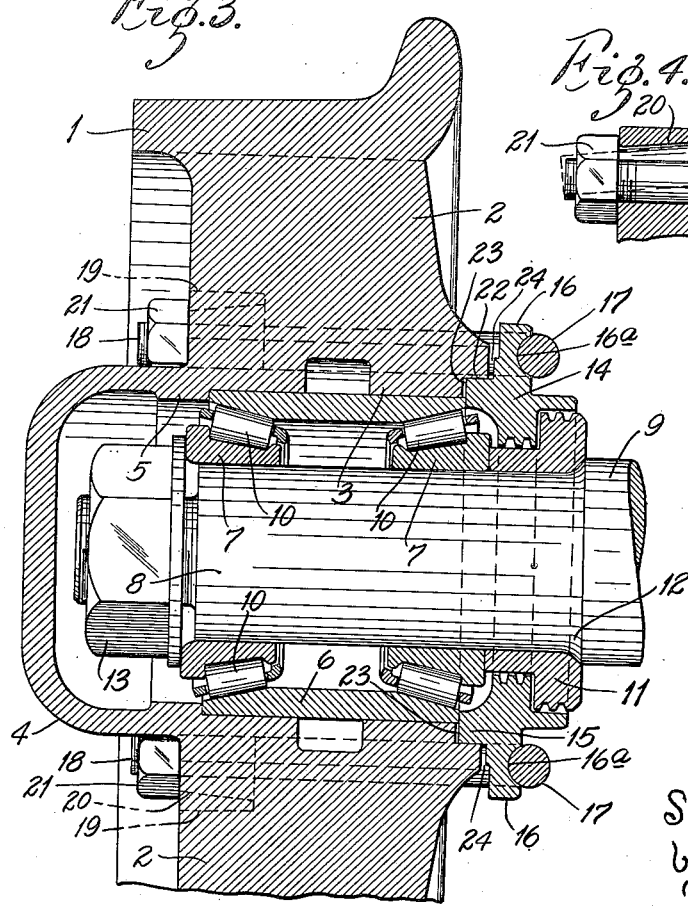
Fig. 3.
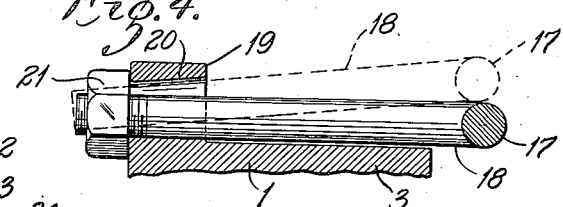
Fig. 4.
Fig. 5.
INVENTOR:
Samson M. Weckstein,
by Cam+Lam+Gravely
HIS ATTORNEYS.

Patented Dec. 10, 1935

2,024,121

UNITED STATES PATENT OFFICE 2,024,121

WHEEL AND BEARING

Samson M. Weckstein, Canton, Ohio, assignor to The Timken Roller Bearing Company, Canton, Ohio, a corporation of Ohio Application June 3, 1935, Serial No. 24,591

3 Claims. (Cl. 295—44)

My invention relates to the mounting of wheels on bearings, particularly wheels of the mine car type wherein a flanged wheel has its hub portion sleeved over the outer bearing member of a roller bearing and is held in position by means of through bolts secured to a member at the inner face of the wheel. The invention has for its principal object the improvement of the fastening means of such wheels.

The invention consists principally in providing U-bolts whose closed ends are looped over projecting plates at the inner face of the wheel and whose arms extend through openings in the wheel that are projected with enlarged flaring portions that permit tilting of said U-bolts to slip over and behind said plates. The invention further consists in the wheel and bearing and in the parts and combinations and arrangements of parts hereinafter described and claimed.

In the accompanying drawing,

Fig. 1 is an elevation of the outer face of a car wheel embodying my invention,

Fig. 2 is an elevation of the inner face thereof, the car axle being shown in section, Fig. 3 is an enlarged sectional view on the line 3—3 in Fig. 2, Fig. 4 is a fragmentary enlarged sectional view on the line 4—4 in Fig. 2, and Fig. 5 is a detail view of one of the U-bolts for securing the car wheel on the bearing member.

The drawing illustrates a mine car wheel 1 having spokes 2 and a cylindrical hub portion 3 whose outer end is closed by an integral cap 4. In said portion 3 near the outer end thereof is an annular rib 5 that seats against the end of the cup 6 or outer bearing member of a double row taper roller bearing on which said wheel 1 is mounted. The cones 7 or inner bearing members are mounted on the reduced end portion 8 of a car axle 9, with conical rollers 10 between the respective cones 7 and the raceway portions of the outer bearing member 6. The innermost cone 7 is seated against a stepped collar 11 that is mounted on the axle 9 with its end against a shoulder 12 thereon. A nut 13 on the threaded outer end of the axle holds the roller bearing in assembled position on the axle.

Cooperating with said collar 11 is a closure ring 14 that abuts against the outer bearing member 6 and has a sleeve portion 15 projecting over the inner end portion of the stepped collar 11. Said closure ring 14 has diametrically spaced projecting portions 16 having concave grooves 16a that receive the closed ends of U-bolts 17 whose arms 18 extend through openings in bosses 19 that project from the wheel hub. Said boss openings have enlarged inclined portions 20 that flare from the outer face of the wheel. Thus, as indicated in dotted lines in Fig. 4, when the wheel 1 is sleeved on the outer bearing member 6, said U-bolts 17 may be tilted so as to clear the ends of their respective securing plates 16 and then may be slipped into position in the grooves 16a in the inner faces of said securing plates. After this the bolts 17 may be secured in position and the wheel and bearing members drawn up tight by means of nuts 21 on the ends of the bolt arms. The inner end of the hub has a counterbore 22 fitting over a portion 15 of said closure ring 14, there being a space 23 between the end of said counterbore 22 and said ring 14 and a space 24 between the hub and said projecting plates 16, whereby the parts may be drawn up tight. This space may be eliminated by machining parts to exact length.

The above arrangement simplifies the operation of assembling a wheel of this type on a bearing member and the parts are securely held together by the simple operation of tightening the nuts. Removal of the wheel is likewise easy. Obviously, numerous changes may be made without departing from the invention. Therefore, I do not wish to be limited to the precise construction shown.

What I claim is:

1. A car wheel bearing comprising an axle, spaced inner bearing members on said axle, rollers thereon, a sleeve having raceway portions in its ends for said rollers, a ring adjacent to the innermost bearing and engaging said sleeve, said ring having diametrically spaced radial projections, a wheel having a hollow hub mounted on said sleeve and provided with perforated bosses and U-bolts extending through said bosses and looped over said projections to engage the faces thereof remote from said wheel.

2. A car wheel bearing comprising an axle, spaced inner bearing members on said axle, rollers thereon, a sleeve having raceway portions in its ends for said rollers, a ring adjacent to the innermost bearing and engaging said sleeve, said ring having diametrically spaced radial projections, a wheel having a hollow hub mounted on said sleeve and provided with perforated bosses and U-bolts extending through said bosses and looped over said projections to engage the faces thereof remote from said wheel, said projections having grooves in which said bolts are seated.

3. A car wheel bearing comprising an axle, spaced inner bearing members on said axle, rollers thereon, a sleeve having raceway portions in its ends for said rollers, a ring adjacent to the innermost bearing and engaging said sleeve, said ring having diametrically spaced radial projections, a wheel having a hollow hub mounted on said sleeve and provided with openings and U-bolts extending through said openings, and looped over said projections to engage the faces thereof remote from said wheel, said openings having flaring enlarged portions permitting tilting of said U-bolts in assembling and disassembling.

SAMSON M. WECKSTEIN.